(12) United States Patent
Schlesinger et al.

(10) Patent No.: US 11,858,329 B2
(45) Date of Patent: Jan. 2, 2024

(54) CENTRAL CONNECTOR FOR VEHICLES HAVING A HIGH-VOLTAGE ACCUMULATOR

(71) Applicant: Bayerische Motoren Werke Aktiengesellschaft, Munich (DE)

(72) Inventors: Benjamin Schlesinger, Garching (DE); Martin Spaeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 323 days.

(21) Appl. No.: 17/294,459

(22) PCT Filed: Nov. 26, 2019

(86) PCT No.: PCT/EP2019/082590
§ 371 (c)(1),
(2) Date: May 17, 2021

(87) PCT Pub. No.: WO2020/109305
PCT Pub. Date: Jun. 4, 2020

(65) Prior Publication Data
US 2022/0016965 A1     Jan. 20, 2022

(30) Foreign Application Priority Data

Nov. 30, 2018   (DE) ..................... 10 2018 130 505.2

(51) Int. Cl.
*B60K 1/04*     (2019.01)
*B60L 50/64*    (2019.01)
(Continued)

(52) U.S. Cl.
CPC .............. *B60K 1/04* (2013.01); *B60L 50/64* (2019.02); *B60L 50/66* (2019.02);
(Continued)

(58) Field of Classification Search
CPC .. B60K 1/04; B60K 2001/0438; B60K 50/66; B60L 50/64; H01M 50/204; H01M 50/262

See application file for complete search history.

(56) References Cited

U.S. PATENT DOCUMENTS

| 8,336,658 B2 | 12/2012 | Rawlinson et al. |
| 8,915,312 B2 | 12/2014 | Lejeune et al. |
| (Continued) | | |

FOREIGN PATENT DOCUMENTS

| DE | 10 2011 083 889 A1 | 4/2013 |
| DE | 10 2014 016 185 A1 | 5/2016 |
| DE | 10 2017 207 389 A1 | 11/2018 |

OTHER PUBLICATIONS

International Search Report (PCT/ISA/210) issued in PCT Application No. PCT/EP2019/082590 dated Apr. 17, 2020 with English translation (five (5) pages).

(Continued)

*Primary Examiner* — Jason D Shanske
*Assistant Examiner* — James J Triggs
(74) *Attorney, Agent, or Firm* — Crowell & Moring LLP

(57) ABSTRACT

A vehicle has a body and a high-voltage accumulator, which is attached to the body via fastening elements, and at least one central connector, which is different from the fastening elements and which is designed to support the body on the high-voltage accumulator. The central connector has a rubber mount with a threaded sleeve, which has a cylindrical wall with an internal thread and an external thread. The external thread is engaged with a compensation bushing. A screw element for connecting the body and rubber mount is screwed into the internal thread, and the rubber mount extends between the body and the high-voltage accumulator.

19 Claims, 3 Drawing Sheets

(51) Int. Cl.
*H01M 50/262* (2021.01)
*H01M 50/204* (2021.01)
*B60L 50/60* (2019.01)

(52) U.S. Cl.
CPC ....... *H01M 50/204* (2021.01); *H01M 50/262* (2021.01); *B60K 2001/0438* (2013.01); *B60Y 2200/91* (2013.01); *B60Y 2400/48* (2013.01); *H01M 2220/20* (2013.01)

(56) References Cited

U.S. PATENT DOCUMENTS

| | | |
|---|---|---|
| 9,884,545 B1 | 2/2018 | Addanki et al. |
| 11,038,236 B2* | 6/2021 | Montgomery ...... H01M 50/244 |
| 11,059,361 B2* | 7/2021 | Bohmer ................... B60K 1/04 |
| 11,588,199 B2* | 2/2023 | Ramadan ............ H01M 10/625 |
| 2018/0062129 A1* | 3/2018 | Hao .................... H01M 50/262 |

OTHER PUBLICATIONS

German-language Written Opinion (PCT/ISA/237) issued in PCT Application No. PCT/EP2019/082590 dated Apr. 17, 2019 (five (5) pages).

German-language Search Report issued in German Application No. 10 2018 130 505.2 dated Nov. 12, 2019 with partial English translation (11 pages).

\* cited by examiner

CENTRAL CONNECTOR FOR VEHICLES HAVING A HIGH-VOLTAGE ACCUMULATOR

BACKGROUND AND SUMMARY OF THE INVENTION

The present invention relates to a vehicle in which a high-voltage accumulator is connected to the body in an optimal manner by way of a central connector.

Electric vehicles or plug-in hybrids are known from the prior art. Such vehicles require a high-voltage accumulator for accumulating energy which can be provided for driving the vehicle. Such high-voltage accumulators are in most instances disposed in the region of the underbody of the vehicle. Since high-voltage accumulators are typically a voluminous contiguous element, a corresponding cutout from the body is required.

In order for the high-voltage accumulator to be fastened to the body, the peripheral regions of the high-voltage accumulator are in particular fixedly screwed or riveted to the body. Moreover, a central connection between the high-voltage accumulator and the body is established. On account thereof, the body in the direction of a vertical axis of the vehicle can be supported on an external wall of the high-voltage accumulator. Various connection techniques, for example screw-fitting, bracing, or adhesive bonding are known for these central connections.

A relative movement between the body and the high-voltage accumulator typically has to be taken into account at the position of the central connector. This movement has to be absorbed or dampened by the body and the lateral wall of the high-voltage accumulator.

It is an object of the invention to provide a vehicle having a high-voltage accumulator with a simple and cost-effective construction and assembly while enabling secure and reliable linking of the high-voltage accumulator to a body of the vehicle.

The object is achieved by the features of the independent claims. The dependent claims include preferred refinements of the invention.

The object is thus achieved by a vehicle which comprises a body and a high-voltage accumulator. The high-voltage accumulator is attached to the body by way of fastening elements. The high-voltage accumulator is in particular connected to the body by way of the fastening elements in peripheral regions. The fastening elements comprise in particular screws and/or rivets for fastening the high-voltage accumulator to the body. Fixed linking of the high-voltage accumulator to the body thus takes place in particular by way of the fastening elements. Additionally, at least one central connector which differs from the fastening elements is provided. The central connector is configured for supporting the body on the high-voltage accumulator. The supporting action takes place in particular in a manner parallel to a vertical axis of the vehicle. It is thus provided that a reinforcement of the body is achieved by connecting the body and an external wall of the high-voltage accumulator. The central connector is in particular a rubber mount. The rubber mount extends between the body and the high-voltage accumulator.

The rubber mount preferably comprises a threaded sleeve which has a cylindrically shaped wall. The cylindrically shaped wall in turn comprises an internal thread as well as an external thread. The threaded sleeve is thus able to be combined with two different elements in that the external thread engages with a compensation bushing while a screw element, in particular a screw, is screwed into the internal thread. The screw element and the compensation bushing are thus preferably disposed so as to be mutually concentric.

The internal thread of the threaded sleeve particularly advantageously serves for linking the rubber mount to the body. To this end, the screw element is screwed into the internal-threaded element in order for the body and the rubber mount to be connected. The rubber mount is able to be fixedly connected to the body by screwing the screw into the internal thread of the threaded sleeve. It is preferably provided on account thereof that the rubber mount by way of the screw element is connected to the body, on the one hand, and to the high-voltage accumulator, on the other hand. This leads to relative movements between the high-voltage accumulator and the body being damped by the rubber mount.

It is moreover provided that the compensation bushing enables tolerances between the high-voltage accumulator and the body to be compensated. A dimension of the rubber mount can thus in particular be varied by a screwing action between the compensation bushing and the threaded sleeve, in particular between the compensation bushing and the external thread of the threaded sleeve. A dimension of the rubber mount is thus adjustable by screwing the compensation bushing in or out. The rubber mount is in particular adjustable in such a manner that the rubber mount bears on the high-voltage accumulator as well as on the body.

A compensation of tolerances between the high-voltage accumulator and the body, on the one hand, and damping of relative movements between the high-voltage accumulator and the body, on the other hand, is enabled by the use of the rubber mount. The damping of movements takes place in particular along that axis along which the rubber mount extends between the high-voltage accumulator and the body. The axis is in particular parallel to the vertical axis of the vehicle. The damping takes place in particular by at least one rubber element which converts the energy of the relative movement to deformation work of the rubber element. Stresses which are to be absorbed by the high-voltage accumulator are reduced on account of relative movements being damped. Stiffening of the body, on the one hand, and excessive stress on the high-voltage accumulator, on the other hand, can thus be prevented.

The screw element advantageously engages through an opening of the compensation bushing so as to be screw-fitted in the internal thread. The opening of the compensation bushing preferably has a circlip. The circlip may in particular be a spring ring. The circlip bears on the screw element when the screw element is guided through the opening. There is thus a connection between the screw element and the compensation bushing. The compensation bushing can therefore be rotated conjointly with the screw element. Since the connection is established in a force-fitting manner by way of the circlip, a maximum torque which is able to be transmitted between the compensation bushing and the screw element is limited. It is thus furthermore possible for the screw element to be rotated in the event of a stationary compensation bushing, and vice versa. Handling of the compensation bushing is thus simplified.

The internal thread and the external thread particularly advantageously have opposite rotating directions. This means that the external thread is preferably a left-hand thread, and the internal thread is preferably a right-hand thread, or vice versa. When the screw element is screwed into the internal thread, the compensation bushing initially rotates because the screw element, prior to reaching the internal thread, has to engage through the opening of the compensation bushing and therein is connected in a force-fitting manner to the compensation bushing by the circlip. A transmission of torque therefore takes place, wherein the compensation bushing is unscrewed from the threaded sleeve, in particular the external thread of the threaded sleeve, when a technician intends to screw the screw element into the threaded sleeve, in particular the internal thread of the threaded sleeve. This unscrewing action takes place in particular until the compensation bushing bears on the body. Any further rotation of the compensation bushing is no longer possible in such a state so that the screw element can be screwed farther through the opening toward the internal thread. Fixing of the screw element takes place therein such that there is a fixed connection between the body and the high-voltage accumulator, wherein a compensation of tolerances is likewise carried out.

The rubber mount preferably has a base plate. The rubber mount is fixedly connected to the high-voltage accumulator by way of the base plate. The threaded sleeve is connected to the base plate in particular by way of a rubber element. The rubber element can preferably be connected to the base plate and to the threaded sleeve in a form-fitting and/or materially integral and/or force-fitting manner. The rubber element acts in a vibration-absorbing manner between the body, the latter being connected to the threaded sleeve by way of the screw element, and the high-voltage accumulator which is fixedly connected to the base plate. It is thus in particular avoided that vibrations are transmitted from the body to the high-voltage accumulated by way of the central connector.

An external ring is advantageously fastened to the base plate. At least one external rubber element that at least partially encloses the compensation bushing is disposed between the external ring and the compensation bushing. In addition to the rubber element, the external rubber element hence is additionally present between the base plate and the threaded sleeve so as to dampen the relative movement between the body and the high-voltage accumulator. This is in particular the case in all of the directions of relative movement. The rubber element and the external rubber element herein are in particular protected in relation to external influences by the base plate and the external ring. This is in particular optimized in that a seal is present between the external ring and the compensation bushing, the seal enabling the external rubber element to be securely and reliably shielded independently of a position of the compensation bushing.

The base plate is particularly advantageously fixedly connected to an external wall of the high-voltage accumulator. The base plate can in particular be connected to the external wall in the form-fitting of force-fitting manner, for example screwed or riveted to the latter. The base plate can also be connected in a form-fitting manner to the external wall, for example welded or adhesively bonded to the latter. In an alternative embodiment, the base plate is part of the external wall of the high-voltage accumulator. This means that the external wall and the base plate are integrally configured. The substructure is thus preferably attached directly to the external wall of the high-voltage accumulator. It is in any case possible in a simple manner with little complexity for the central connector to first be offered up to the high-voltage accumulator and for the central connector to be fastened to the body in a subsequent assembly step. The fastening to the body advantageously enables a compensation of tolerances. The central connector is thus able to be attached in a simple manner with little complexity and can enable relative movements between the high-voltage accumulator and the body to be damped in a safe and reliable manner.

It is advantageously provided that the central connector is disposed on a largest external face of the high-voltage accumulator. The central connector is in particular disposed so as to be centric on a largest external face of the high-voltage accumulator. If a plurality of the external faces of the high-voltage accumulator are of identical size and larger than the other external faces, it is thus in particular provided that the central connector is disposed on one of the largest external faces. The high-voltage accumulator is preferably configured so as to be cuboid. The high-voltage accumulator thus has two largest external faces, wherein these largest external faces are in particular oriented so as to be perpendicular to the vertical axis of the vehicle. The central connector is attached to an upper one of these external faces, thus connecting the high-voltage accumulator to the body.

A dimension of the rubber mount along a vertical axis of the vehicle preferably is at most 50.0 millimeters. The dimension is particularly advantageously at most 27.5 millimeters, in particular at most 20.5 millimeters. The dimension of the rubber mount along the vertical axis is particularly advantageously able to be varied by at most 10 mm, in particular by at most 7 mm, by means of the compensation bushing. This is able to be achieved in that the compensation bushing is screw-fitted to the external thread. On account of the screw-fitment, the compensation bushing can project beyond the threaded sleeve by a certain margin and, on account thereof, cause a variation of the dimension of the rubber mount. A compensation of tolerances of the rubber mount is thus enabled during the assembling. It is moreover advantageously provided that a dimension of the rubber mount in a plane perpendicular to the vertical axis of the vehicle is at most 120 millimeters, preferably at most 50 millimeters, in particular at most 38 millimeters. The rubber mount can thus be attached in a manner that saves installation space. At the same time, a secure and reliable damping of relative movements of the high-voltage accumulator and the body is made possible so as to achieve a reliable support of the body on the high-voltage accumulator with minor forces.

Further details, features, and advantages of the invention are derived from the description hereunder and from the figures.

DETAILED DESCRIPTION OF THE DRAWINGS

Figure 1:
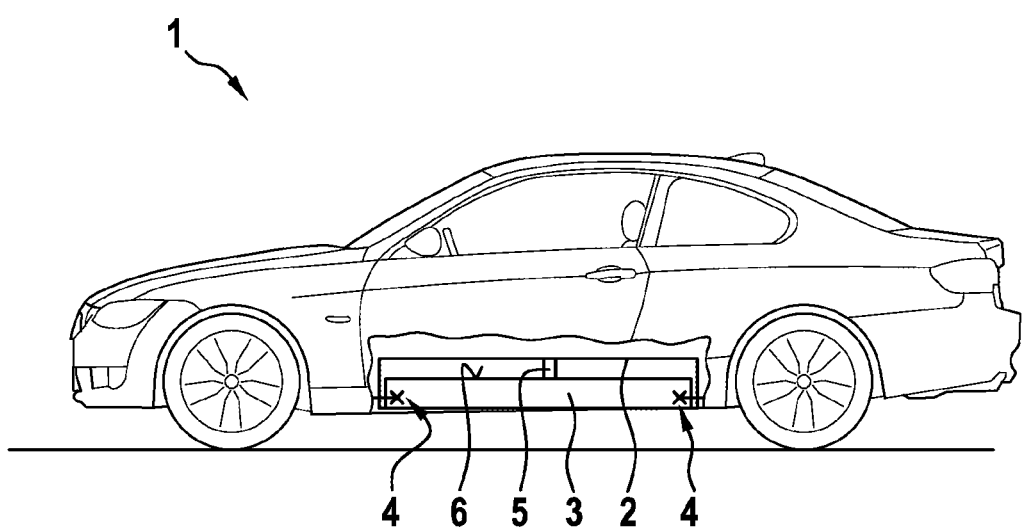
FIG. 1 is a schematic view of a vehicle according to an exemplary embodiment of the invention.

FIG. 1 schematically shows a vehicle 1 according to an exemplary embodiment of the invention. The vehicle 1 is in particular an electric vehicle or a plug-in hybrid. The vehicle 1 is thus configured for providing electric energy.

The vehicle 1 comprises a body 2 and a high-voltage accumulator 3. The high-voltage accumulator 3 in the peripheral region is fastened to the body 2 by way of fastening elements 4 and is thus fixedly connected to the body 2. The body 2 herein has a cutout in which the high-voltage accumulator 3 is attached. The body is potentially weakened by such a cutout such that support by way of a central connector 5 is advantageous.

The high-voltage accumulator 3 is substantially cuboid. It is provided herein that the largest external faces 6 of the high-voltage accumulator 3 are oriented so as to be perpendicular to a central axis of the vehicle 1. A largest external face 6 is in particular present on an upper side of the high-voltage accumulator 3. The central connector 5 connects the body 2 to this external face 6 of the high-voltage accumulator 3 and thus permits the body 2 to be supported on the high-voltage accumulator 3. The central connector 5 is in particular disposed so as to be centric on the external face 6.

Figure 2:
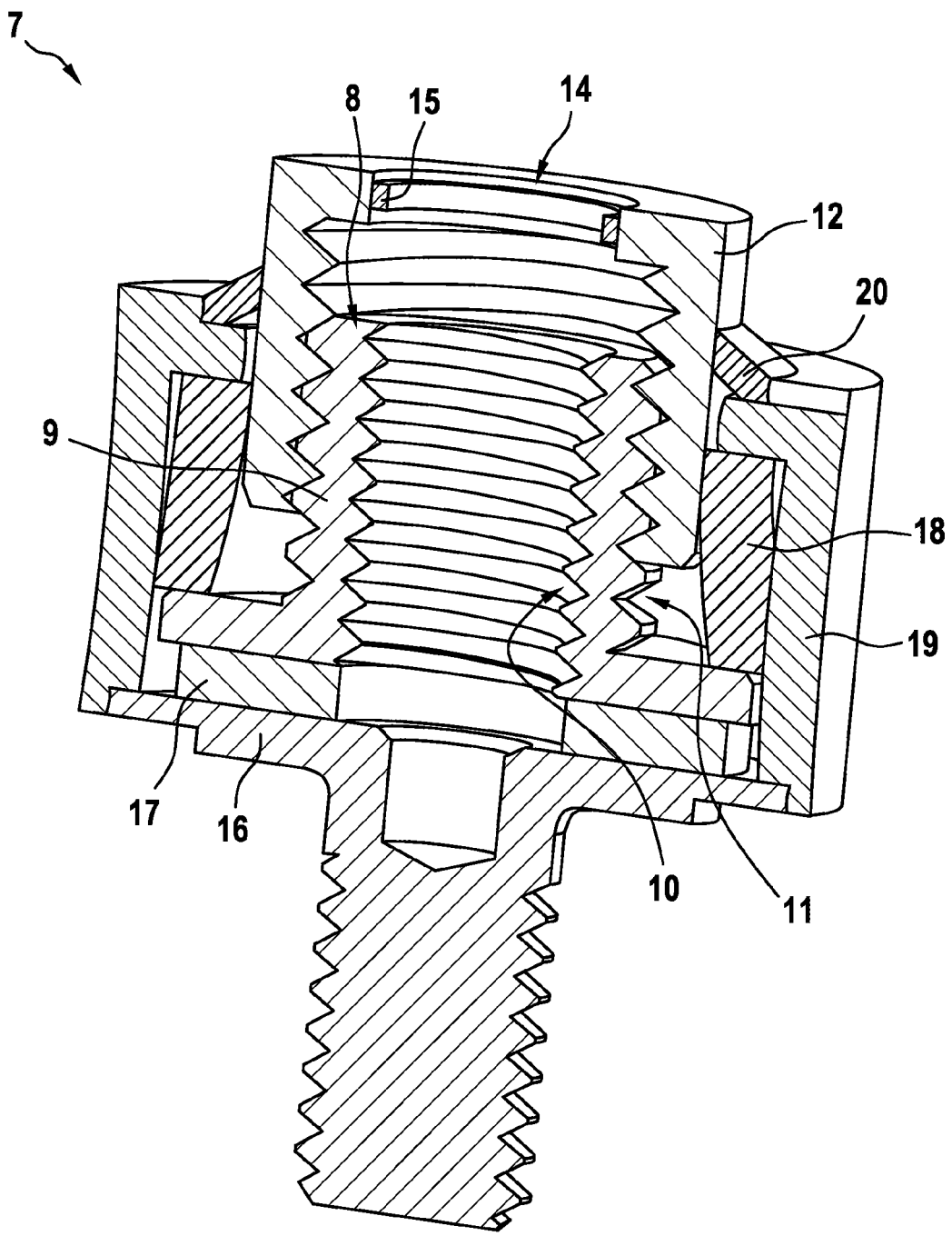
FIG. 2 is a schematic view of the design of the central connector of the vehicle according to the exemplary embodiment of the invention.
Figure 3:
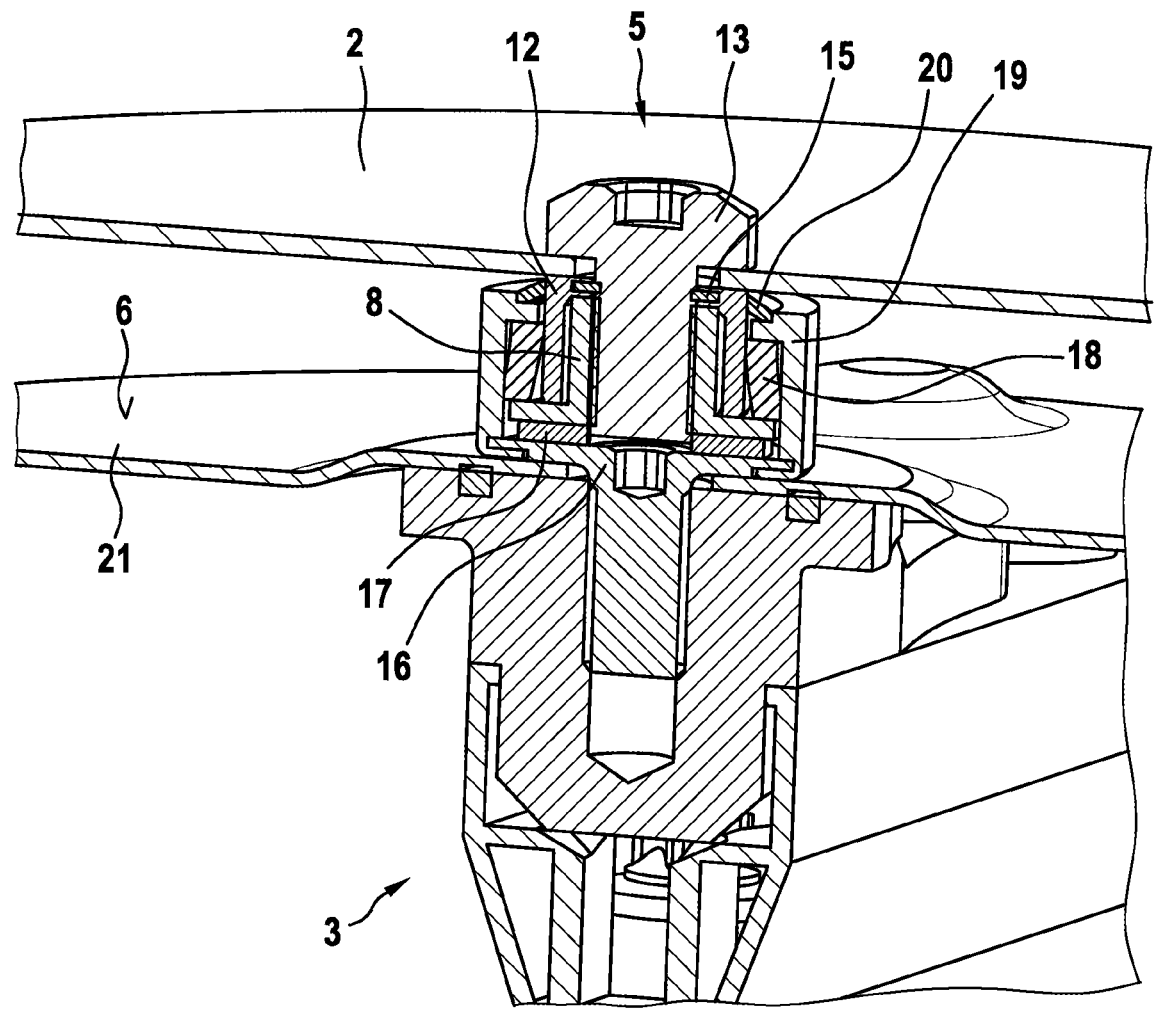
FIG. 3 is a schematic view of linking the high-voltage accumulator to the body of the vehicle according to the exemplary embodiment of the invention.

FIG. 2 schematically shows the central connector 5 configured as a rubber mount 7. FIG. 3 shows a schematic view of the central connector 5 in the installed state between the high-voltage accumulator 3 and the body 2. FIGS. 2 and 3 are therefore conjointly described hereunder.

The rubber mount 7 has a threaded sleeve 8. The threaded sleeve 8 in turn comprises a cylindrical wall 9, wherein an internal thread 10 as well as an external thread 11 are attached to the wall 9. Two different elements can thus be fastened to the threaded sleeve in a mutually independent manner by way of screw-fitting, wherein both elements are disposed so as to be concentric.

The internal thread 10 serves for fastening the rubber mount 7 to the body 2 by means of a screw element 13. In the exemplary embodiment shown in FIG. 3, the screw element 13 is a flat-head screw. The threaded sleeve 8 is advantageously made from a metal or a plastics material. A compensation of tolerances is to be preferably provided in order for the rubber mount 7 to be linked to the body 2. A spacing between the high-voltage accumulator 3 and the body 2 herein is in particular to be compensated for. To this end, the rubber mount 7 has a compensation bushing 12 which is screwed onto the external thread 11.

When the compensation bushing 12 is screw-fitted to the external thread, an entire dimension of the rubber mount 7 is thus varied. On account thereof, the rubber mount 7 can be adapted to a spacing between the body 2 and the high-voltage accumulator 3.

The compensation bushing 12 has an opening 14 through which the screw element 13 is guided. The screw element 13 serves for connecting the body 2 to the internal thread 10 of the threaded sleeve 8 of the rubber mount 7. In order to guarantee simple handling of the rubber mount 7 during assembling, it is provided that the compensation bushing 12 is also able to be activated by way of the screw element 13.

In order for this simple handling capability to be achieved, the compensation bushing 12 in the opening 14 has a circlip 15, in particular a spring element, so that the compensation bushing 12 and the screw element 13 are connected in a force-fitting manner. The external thread 11 and the internal thread 10 furthermore have threads with different rotating directions. For example, the internal thread 10 has a right-hand thread, and the external thread 11 has a left-hand thread. When the body 2 is to be connected to the rubber mount 7 by way of the screw element 13, the following assembly steps are thus provided.

First, the screw element 13 is guided through an opening of the body 2 and through the opening 14 of the compensation bushing 12. The screw element 13 is then connected in a force-fitting manner to the compensation bushing 12. When the screw element 13 is rotated in the screwing-in direction thereof, the compensation bushing 12 is thus initially unscrewed from the external thread 11. This takes place until the compensation bushing 12 bears on the body 2, which means that a compensation of tolerances has been carried out. The compensation bushing 12 can subsequently not to be moved any further so that the screw element 13 rotates in relation to the compensation bushing 12 until the screw element 13 is fixedly connected to the internal thread 10. On account thereof, the body 2 is linked to the rubber mount 7.

The screw element 13 has thus only to be rotated in the screwing-in direction so as to carry out a compensation of tolerances as well as establish a connection between the body 2 and the high-voltage accumulator 3. The handling of the rubber mount 7 is thus simplified.

The rubber mount 7 has a base plate 16, as well as a rubber element 17 and an external rubber element 18, the latter two being configured for receiving and absorbing relative movements between the body 2 and the base plate 16. The rubber element 17, like the external rubber element 18, can be produced from a natural or synthetic rubber. It is provided that the rubber element 17 is fixedly connected to the base plate 16. The rubber element 17 is in particular adhesively bonded to the base plate 16. The external rubber element 18 advantageously extends at least partially about the threaded sleeve 8. The external rubber element 18 is in particular situated between an external ring 19 connected to the base plate and the compensation bushing 12. The rubber element 17 and the external rubber element 18 can thus reliably dampen relative movements between the high-voltage accumulator and the body.

The rubber mount 7 is linked to the high-voltage accumulator 3 by way of the base plate 16. The base plate 16 is attached to an external wall 21 of the high-voltage accumulator 3 that forms the external face 6. For example, the base plate 16 can be screwed, riveted or adhesively bonded to the external wall 21. Alternatively, the external wall 21 can be configured so as to be integral to the base plate 16 such that the rubber element 17 is fastened directly to the high-voltage accumulator 3.

If a relative movement arises between the body 2 and the high-voltage accumulator 3, the rubber element 17 and/or the external rubber element 18 are thus deformed on account of which the relative movement is damped. Since there is a connection between the high-voltage accumulator 3 and the body 2 by way of the rubber element 17 and/or the external rubber element 18, supporting the body 2 on the high-voltage accumulator 3 by way of the rubber mount 3 is made possible.

The rubber mount 7 moreover has a seal 20 by way of which a gap between the compensation bushing 12 and the external ring 19 is sealed independently of a position of the compensation bushing 12. The rubber mount 7 can thus be sealed in relation to the body 2 and in relation to the high-voltage accumulator 3. In particular, the rubber element 17 and the external rubber element 18 are protected in relation to external influences by the external ring 19 and the base plate 16. A secure and reliable damping function is thus provided.

A dimension of the rubber mount 7 along a vertical axis of the vehicle 1 is preferably at most 50.0 millimeters or at most 27.5 millimeters or at most 20.5 millimeters. A compensation of tolerances of at most 10 mm, in particular at most 7 mm, along the vertical axis is particularly advantageously enabled by means of the compensation bushing 12. This is achieved in particular in that the compensation bushing 12, proceeding from a central position on the external thread 11, is able to be moved at least 5 mm, in particular at least 3.5 mm, in each screwing direction. Moreover, a dimension of the rubber mount 7 in a plane perpendicular to the vertical axis of the vehicle 1 is at most 120 millimeters or at most 50 millimeters or at most 38 millimeters. The rubber mount 7 can thus be attached in a manner that saves installation space. At the same time, secure and reliable damping of relative movements between the high-voltage accumulator 3 and the body 2 is made possible so as to achieve a reliable support of the body 2 on the high-voltage accumulator 3 with minor forces.

LIST OF REFERENCE SIGNS

1 Vehicle
2 Body
3 High-voltage accumulator
4 Fastening element
5 Central connector
6 External face
7 Rubber mount
8 Threaded sleeve
9 Wall
10 Internal thread
11 External thread
12 Compensation bushing
13 Screw element
14 Opening
15 Circlip
16 Base plate
17 Rubber element
18 External rubber element
19 External ring
20 Seal
21 External wall

What is claimed is:

1. A vehicle, comprising:
   a body;
   a high-voltage accumulator which is attached to the body by way of fasteners; and
   at least one central connector, which is different from said fasteners and which is configured to support the body on the high-voltage accumulator,
   wherein the central connector has a rubber mount with a threaded sleeve which has a cylindrically shaped wall with an internal thread and an external thread,
   wherein the external thread engages with a compensation bushing,
   wherein a screw element for connecting the body and the rubber mount is screwed into the internal thread,
   wherein the rubber mount extends between the body and the high-voltage accumulator,
   wherein the screw element engages through an opening of the compensation bushing, and
   wherein the opening has a circlip which bears on the screw element.

2. The vehicle according to claim 1, wherein the internal thread and the external thread have opposite threaded directions.

3. The vehicle according to claim 1, further comprising: a base plate, wherein
   the rubber mount is fixedly connected to the high-voltage accumulator by way of the base plate, and
   the threaded sleeve is connected to the base plate by way of a rubber element.

4. The vehicle according to claim 1, wherein the central connector is disposed so as to be centric on a largest external face of the high-voltage accumulator.

5. The vehicle according to claim 1, wherein a dimension of the rubber mount along a vertical axis of the vehicle is 50.0 millimeters or less.

6. The vehicle according to claim 1, wherein a dimension of the rubber mount along a vertical axis of the vehicle is 27.5 millimeters or less.

7. The vehicle according to claim 1, wherein a dimension of the rubber mount along a vertical axis of the vehicle is 20.5 millimeters or less.

8. The vehicle according to claim 1, wherein, by screwing the compensation bushing in and out relative to the external thread, a dimension of the rubber mount along a vertical axis of the vehicle is variable by 10 mm or less.

9. The vehicle according to claim 1, wherein, by screwing the compensation bushing in and out relative to the external thread, a dimension of the rubber mount along a vertical axis of the vehicle is variable by 7 mm or less.

10. The vehicle according to claim 1, wherein a dimension of the rubber mount in a plane perpendicular to a vertical axis of the vehicle is 120 millimeters or less.

11. The vehicle according to claim 1, wherein a dimension of the rubber mount in a plane perpendicular to a vertical axis of the vehicle is 50 millimeters or less.

12. The vehicle according to claim 1, wherein a dimension of the rubber mount in a plane perpendicular to a vertical axis of the vehicle is 38 millimeters or less.

13. A vehicle, comprising:
    a body;
    a high-voltage accumulator which is attached to the body by way of fasteners; and
    at least one central connector, which is different from said fasteners and which is configured to support the body on the high-voltage accumulator,
    wherein the central connector has a rubber mount with a threaded sleeve which has a cylindrically shaped wall with an internal thread and an external thread,
    wherein the external thread engages with a compensation bushing,
    wherein a screw element for connecting the body and the rubber mount is screwed into the internal thread, and
    wherein the rubber mount extends between the body and the high-voltage accumulator,
    wherein the vehicle further comprises a base plate, wherein
    the rubber mount is fixedly connected to the high-voltage accumulator by way of the base plate, and
    the threaded sleeve is connected to the base plate by way of a rubber element.

14. The vehicle according to claim 13, wherein the screw element engages through an opening of the compensation bushing, and the opening has a circlip which bears on the screw element.

15. The vehicle according to claim 13, wherein an external ring is fastened to the base plate, and
    at least one external rubber element, which partially or fully encloses the compensation bushing, is disposed between the external ring and the compensation bushing.

16. The vehicle according to claim 13, wherein the base plate is fixedly connected to an external wall of the high-voltage accumulator, or is part of the external wall of the high-voltage accumulator.

17. A vehicle, comprising:
    a body;

a high-voltage accumulator which is attached to the body by way of fasteners; and at least one central connector, which is different from said fasteners and which is configured to support the body on the high-voltage accumulator, wherein the central connector has a rubber mount with a threaded sleeve which has a cylindrically shaped wall with an internal thread and an external thread, wherein the external thread engages with a compensation bushing, wherein a screw element for connecting the body and the rubber mount is screwed into the internal thread, wherein the rubber mount extends between the body and the high-voltage accumulator, and wherein a dimension of the rubber mount along a vertical axis of the vehicle is 50.0 millimeters or less.

18. The vehicle according to claim 17, wherein a dimension of the rubber mount along a vertical axis of the vehicle is 27.5 millimeters or less.

19. The vehicle according to claim 17, wherein a dimension of the rubber mount along a vertical axis of the vehicle is 20.5 millimeters or less.

\* \* \* \* \*